Sept. 18, 1956 D. C. WELLER 2,763,726

TELEPHONE RINGING-SIGNAL TRANSMISSION SYSTEM

Filed Sept. 10, 1954 7 Sheets-Sheet 1

INVENTOR
D. C. WELLER
BY R. B. Ardis
ATTORNEY

Sept. 18, 1956 D. C. WELLER 2,763,726

TELEPHONE RINGING-SIGNAL TRANSMISSION SYSTEM

Filed Sept. 10, 1954 7 Sheets-Sheet 2

INVENTOR
D. C. WELLER
BY R. B. Ardis
ATTORNEY

Sept. 18, 1956 D. C. WELLER 2,763,726

TELEPHONE RINGING-SIGNAL TRANSMISSION SYSTEM

Filed Sept. 10, 1954 7 Sheets-Sheet 3

INVENTOR
D. C. WELLER
BY R. B. Ardis
ATTORNEY

TELEPHONE RINGING-SIGNAL TRANSMISSION SYSTEM

Filed Sept. 10, 1954

INVENTOR
D. C. WELLER
BY R. B. Ardis
ATTORNEY

Sept. 18, 1956 D. C. WELLER 2,763,726
TELEPHONE RINGING-SIGNAL TRANSMISSION SYSTEM
Filed Sept. 10, 1954 7 Sheets-Sheet 5
FIG. 5A
RINGING CODE
| PARTY | LINE | $f_1$ | $f_2$ | $f_3$ |
|---|---|---|---|---|
| A | +R | ✓ | | ✓ |
| B | −R | ✓ | | |
| C | +T | ✓ | ✓ | |
| D | −T | ✓ | ✓ | ✓ |
FIG. 5B
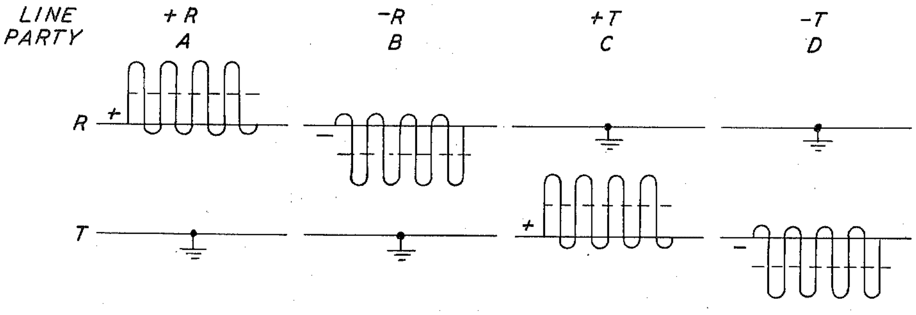
FIG. 5C
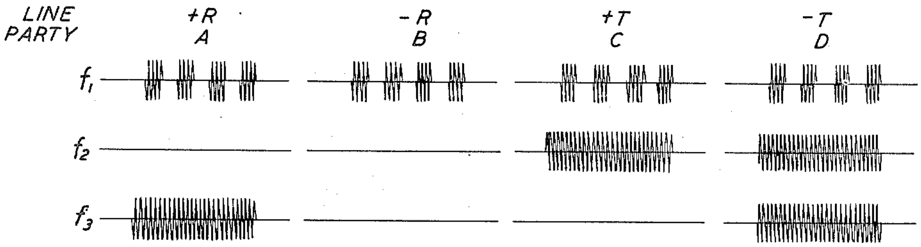
FIG. 5D
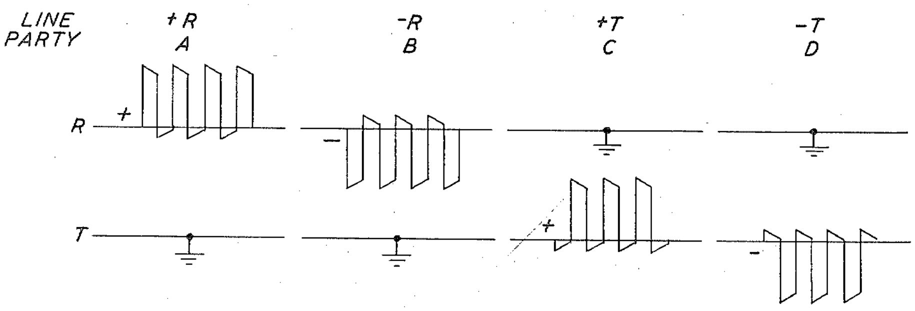
INVENTOR
D. C. WELLER
BY R. B. Ardis
ATTORNEY

TELEPHONE RINGING-SIGNAL TRANSMISSION SYSTEM

Filed Sept. 10, 1954

INVENTOR
D. C. WELLER
BY R. B. Ardis
ATTORNEY

Sept. 18, 1956 D. C. WELLER 2,763,726
TELEPHONE RINGING-SIGNAL TRANSMISSION SYSTEM
Filed Sept. 10, 1954 7 Sheets-Sheet 7
FIG. 8A
RINGING CODE
| PARTY | LINE | $f_1$ | $f_2$ | $f_3$ |
|---|---|---|---|---|
| A | +R | ✓ | | ✓ |
| B | −R | ✓ | | |
| C | +T | ✓ | ✓ | ✓ |
| D | −T | ✓ | ✓ | |
FIG. 8B
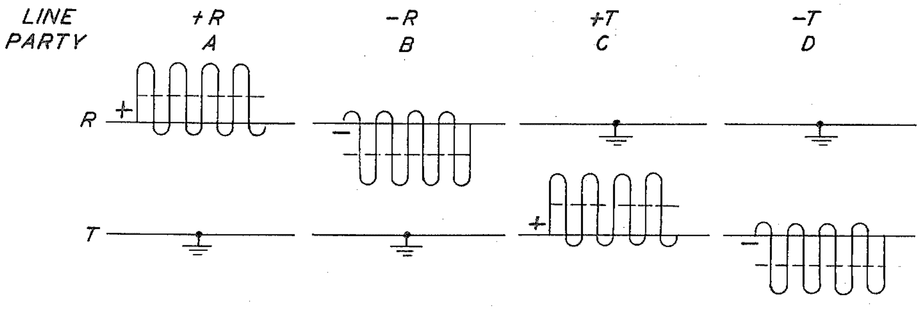
FIG. 8C
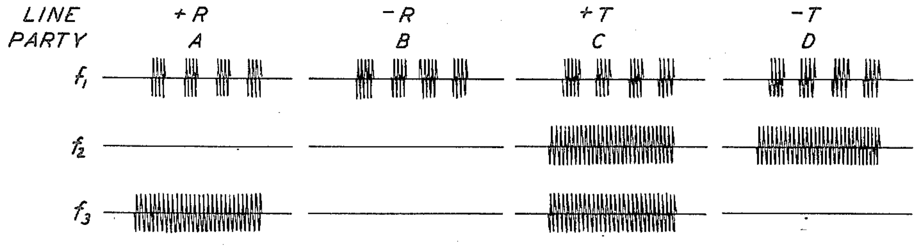
FIG. 8D
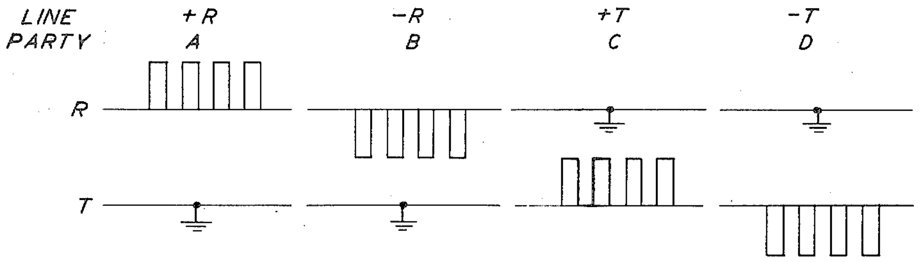
INVENTOR
D. C. WELLER
BY R. B. Ardis
ATTORNEY United States Patent Office 2,763,726

Patented Sept. 18, 1956

2,763,726

TELEPHONE RINGING-SIGNAL TRANSMISSION SYSTEM

David C. Weller, Lake Mohawk, N. J., assignor to Bell Telephone Laboratories, Incorporated, New York, N. Y., a corporation of New York Application September 10, 1954, Serial No. 455,129

18 Claims. (Cl. 179—84)

This invention relates generally to the transmission of ringing signals from a telephone central office to called multiparty-line subscribers and more particularly, although in its broader aspects not exclusively, to the transmission of such information over a carrier transmission system.

A principal object of the invention is to transmit multiparty-line subscriber ringing signals over a carrier transmission system at a low power level comparable to the level of voice-message transmission.

Another and more particular object is to provide ringing as complex as either four-party full selective or eight-party semiselective subscriber ringing in a rural carrier telephone system without transmitting full ringing power over the carrier line.

A related object is to transmit subscriber ringing signals at reduced power level over a carrier transmission without requiring changes in the structure or operation of either the standard central office equipment for generating ringing signals or the telephone equipment on the premises of individual subscribers.

A rural carrier telephone system for the distribution of calls from a central office to either single or multiparty-line subscribers forms the basis for copending application Serial No. 455,099, filed the same date as the present application by V. J. Hawks, E. K. Van Tassel, and D. C. Weller. Broadly, such a system includes, for each individual multiparty subscriber line, a primary office terminal located at the central office for converting from voice to carrier frequencies, a carrier transmission line, a pole-mounted outlying satellite terminal located at a point remote from the central office for reconverting from carrier to voice frequencies, and connections from the outlying terminal to a relatively short local multiparty subscriber voice-frequency distribution line.

In most telephone systems for the distribution of calls from a central office to subscribers, the amount of power required by each subscriber's telephone set for ringing purposes is much greater than that needed for reconstruction of the transmitted voice message. In the past, ringing power has usually been generated at the central office and transmitted to the called subscriber over the voice line that is used for call distribtuion. The difficulty involved in providing ringing power supplies at each individual subscriber's set has thereby been avoided. However, while such an arrangement is generally satisfactory in systems in which call distribution from the central office is completely on a voice-frequency basis, it presents problems in a carrier system such as that disclosed in the above-identified copending application. The level of power needed for ringing purposes is generally so much higher than that required for normal voice transmission that it is likely to exceed the power-handling capacity of the terminal and repeater components of a carrier transmission system. This is particularly true when transistors constitute the principal active gain-producing elements of the carrier system. In addition, the standard ringing signals provided in the telephone central office for multiparty-line subscriber ringing of the higher grades are so different in their several variations which determine which party it is that is rung that they are difficult to transmit on anything but an all-voice frequency basis.

For four-party full selective or eight-party semi-selective ringing on a multiparty subscriber line, the ringing signal generated at the telephone central office generally takes the form of a low frequency (e. g., 20-cycle) A.-C. component superimposed upon a D.-C. component. This composite ringing signal is applied between either one of the two sides of the outgoing multiparty subscriber voice line and ground, and the polarity of the D.-C. component is either positive or negative with respect to ground, giving the four possible ringing voltage combinations.

The present invention permits complete multiparty-line subscriber ringing information of this type to be transmitted over a carrier telephone system at a power level comparable to that of the normally transmitted voice signals. In accordance with the present invention, three separate voice-frequency tones are supplied to an office terminal of a rural carrier telephone system to permit coding of the standard ringing signal generated at the central office. Those that are needed to provide the required ringing information are transmitted, on a carrier-frequency basis, to the associated outlying carrier terminal, and the original ringing signal is recreated at the outlying terminal from the received tones and local power for transmission to the called subscriber's telephone set. Of the three voice-frequency tones used to transmit ringing information, the first is transmitted whenever a ringing signal appears across the voice line at the office terminal, the second is transmitted whenever the ringing signal appears between a particular side of the voice line and ground, and the third is transmitted whenever the D.-C. component of the ringing signal has a predetermined polarity. The presence or absence of each of these tones at the outlying terminal permits accurate reconstruction of the original ringing signal for transmission over the multiparty subscriber voice line to the called subscriber's telephone set. Full ringing power is supplied locally at the outlying terminal, permitting the three tones to be transmitted over the carrier line from the office terminal at the same low level as the regularly transmitted voice signals. The invention requires no change in the structure or operation of either the standard central office equipment for the generation of ringing information or the telephone equipment located on each subscriber's premises. Such equipment remains unaffected by the application of a carrier system embodying the invention, thus facilitating greatly the application of the invention to already existing rural telephone systems.

Other objects and features of the invention will be apparent from the following detailed description of several specific embodiments. In the drawings:

Figs. 1 and 2, taken together, illustrate an office carrier terminal embodying features of the invention;

Figs. 3 and 4, taken together, illustrate an outlying carrier terminal embodying features of the invention;

Fig. 5A is a chart showing the subscriber ringing code used in the carrier terminals illustrated in Figs. 1, 2, 3, and 4;

Fig. 5B illustrates the ringing voltage wave-forms applied at the telephone central office to the voice line of the office terminal shown in Figs. 1 and 2;

Fig. 5C shows the voice-frequency-tone wave-forms generated, in accordance with a feature of the invention, to transmit the ringing information given in Fig. 5B over the carrier line;

Fig. 5D shows the ringing voltage wave-forms reconstructed from the voice-frequency tones of Fig. 5C at the outlying carrier terminal illustrated in Figs. 3 and 4;

Figures 1, 6:
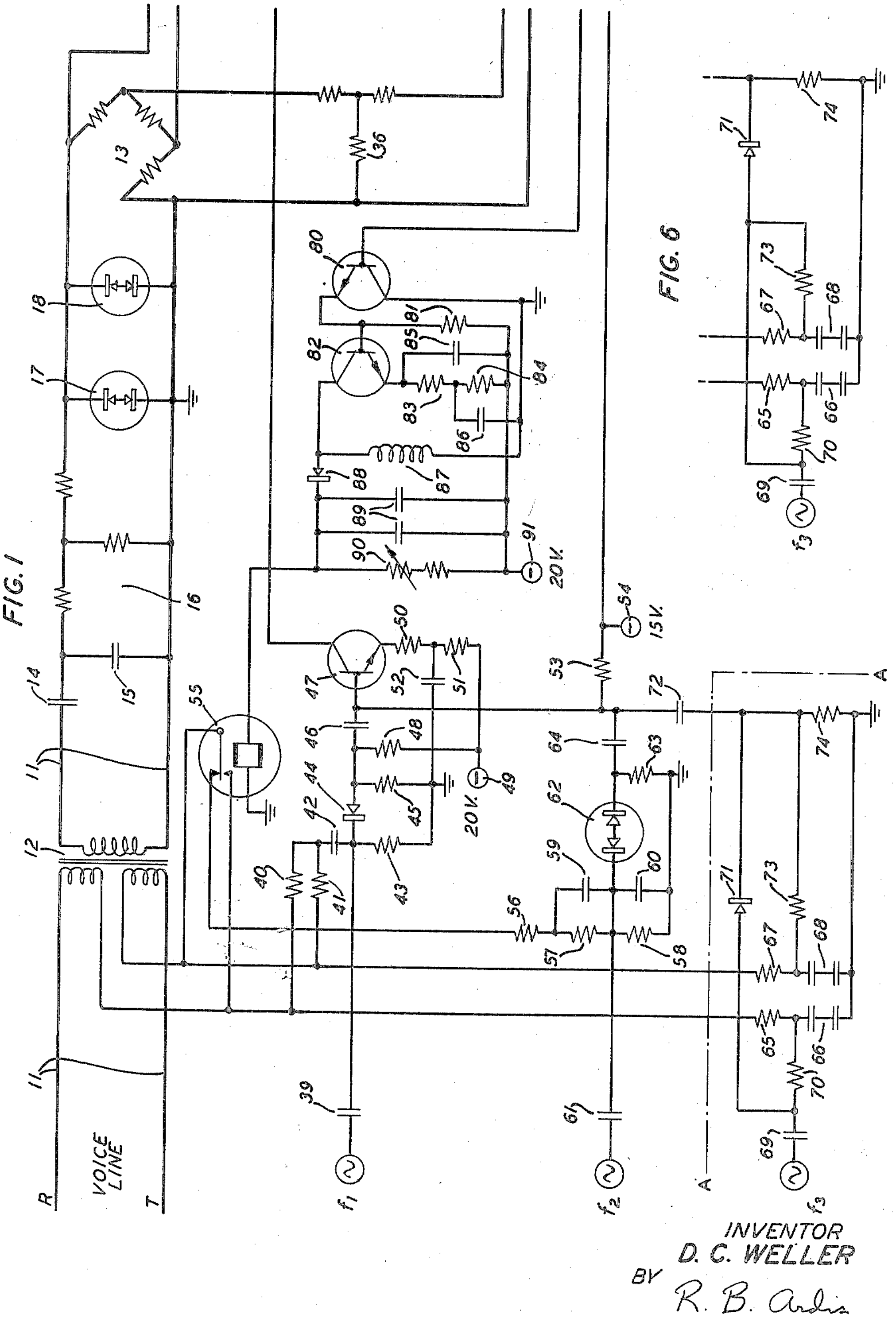
Figure 2:
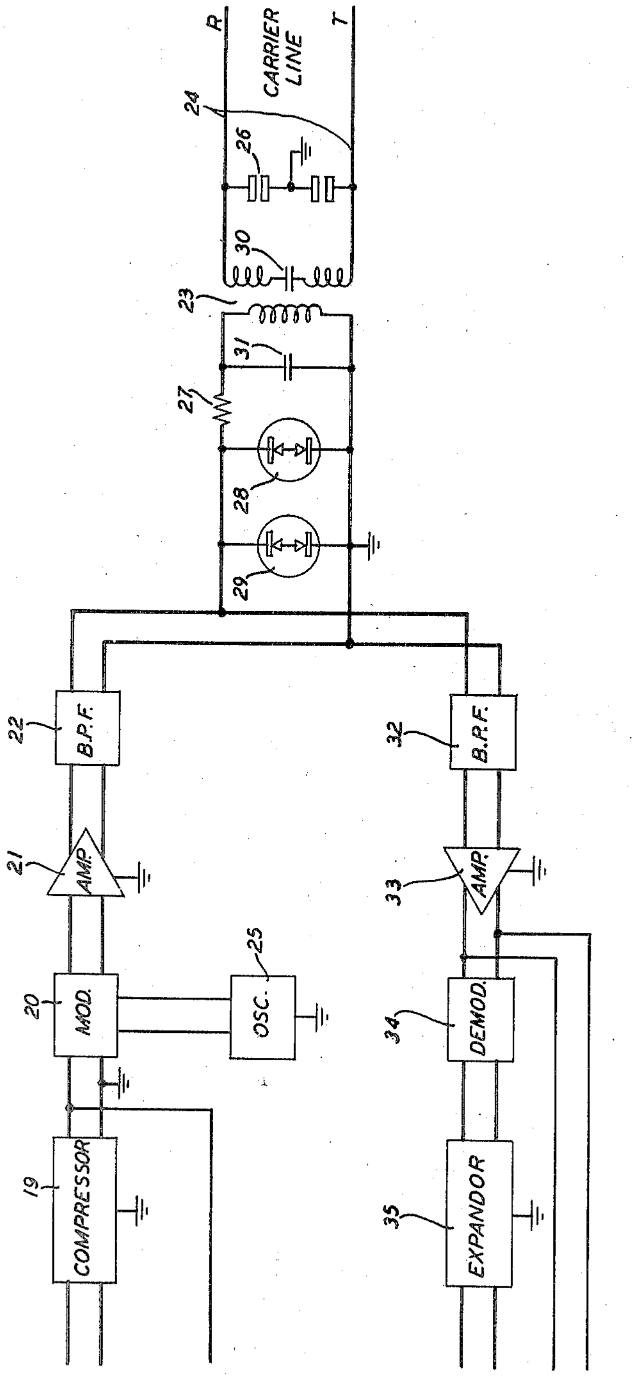
Figure 3:
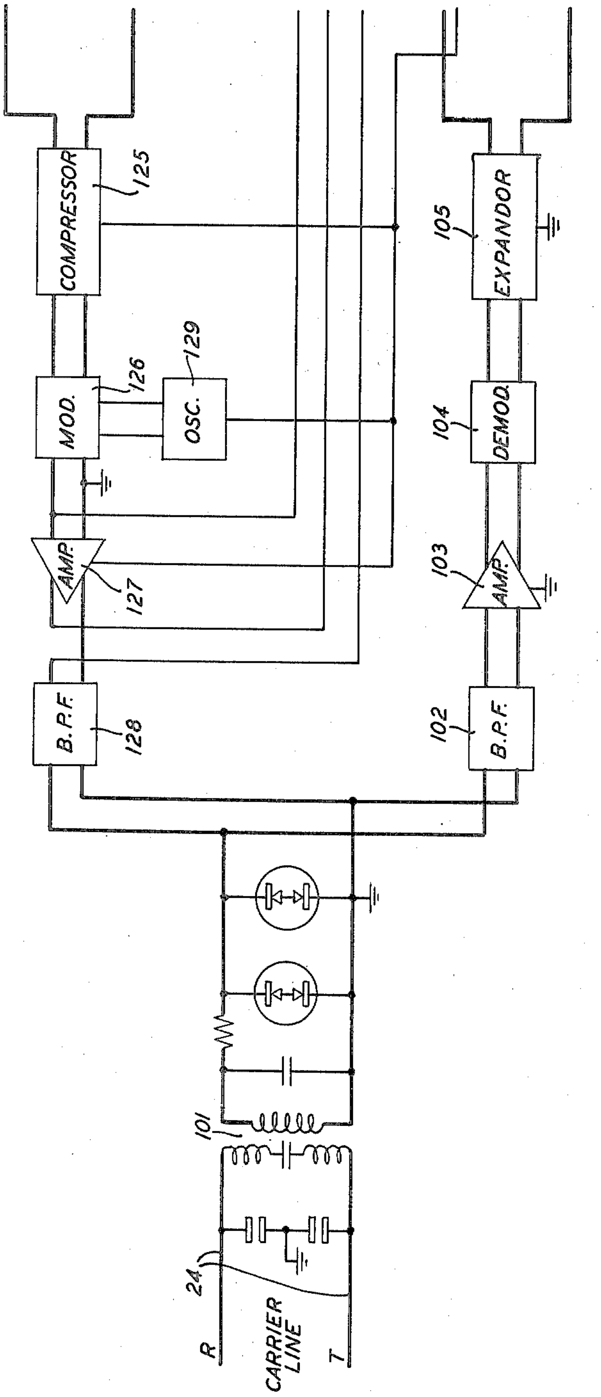
Figure 7:
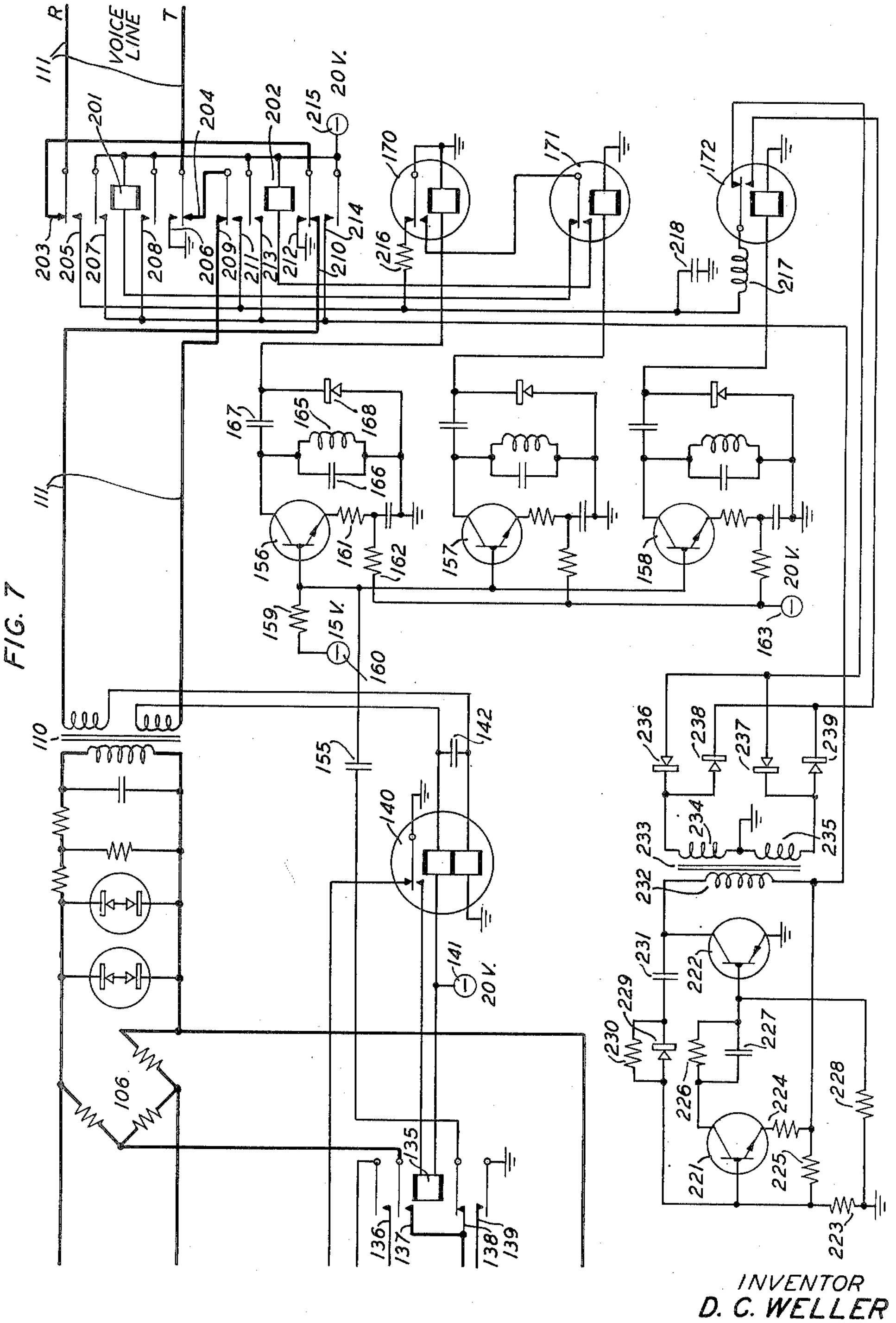

Fig. 6, when fitted to Fig. 1 along the line A—A, converts the circuit of Figs. 1 and 2 to an alternative office terminal embodying the several features of the invention;

Fig. 7, taken with Fig. 3, illustrates an alternative outlying carrier terminal embodying features of the invention;

Fig. 8A is a chart showing the subscriber ringing code used with the combination of carrier terminals illustrated in Figs. 1, 2, 3, 6, and 7;

Fig. 8B is the same as Fig. 5B and illutrates the ringing voltage wave-forms applied at the telephone central office to the voice line of the office carrier terminal shown in Figs. 1, 2, and 6;

Fig. 8C shows the voice-frequency-tone wave-forms used in accordance with the present invention to transmit the ringing information of Fig. 8B over the carrier line to the outlying terminal of Figs. 3 and 7; and Fig. 8D shows the ringing voltage wave-forms reconstructed from the voice-frequency tones of Fig. 8C at the alternative outlying carrier terminal illustrated in Figs. 3 and 7.

*Office carrier terminal—Figs. 1 and 2*

Figs. 1 and 2, taken together, illustrate a primary office carrier terminal, embodying features of the invention, for use in the rural carrier telephone system disclosed in Fig. 1 of the above-identified copending application of V. J. Hawks, E. K. Van Tassel, and D. C. Weller. For a complete representation of the office terminal, Fig. 2 should be placed immediately to the right of Fig. 1, with the leads at the left-hand side of Fig. 2 matching the leads at the right-hand side of Fig. 1.

Balanced voice line 11 at the left-hand side of Fig. 1 is the line to which the central office supplies both standard ringing signals and voice-frequency telephone messages. In a conventional system for the distribution of calls from the central office to subscribers, voice line 11 would be the office end of an individual multiparty subscriber voice line. In a carrier system, however, a substantial part of the intermediate transmission between the central office and the subscribers is on a carrier-frequency rather than a voice-frequency basis. The present invention permits the central office equipment and the subscriber telephone sets to operate in the same manner that they would if transmission were entirely on a voice-frequency basis. In other words, the invention permits the standard central office equipment to present to voice line 11 in Fig. 1 the same ringing and voice signals that it would in an all voice-frequency distribution system and the individual subscriber sets to receive from the outlying carrier terminal substantially the same ringing and voice signals that they would receive directly from the central office in an all voice-frequency distribution system.

In Fig. 1, balanced voice line 11 is coupled through a transformer 12 to the terminals defining one arm of a four-terminal resistance bridge 13. Between bridge circuit 13 and transformer 12, one side of voice line 11 is grounded. Immediately to the right of transformer 12, a condenser 14 is connected in series with the ungrounded side of voice line 11 to block the transmission of ringing signals, and a second condenser 15 is connected across the line to attenuate frequencies above the voice band. A T-type resistance pad 16 is connected in series with the line to cooperate with two pairs of silicon p-n junction diodes 17 and 18 in providing protection for succeeding apparatus from unduly high voltage surges. The first pair of diodes 17 are oppositely poled and connected in series across line 11. The second pair of diodes 18 are similarly connected to increase the current-carrying capacity of the high voltage protection circuit. For more complete details concerning the high voltage protection circuit made up of diode pairs 17 and 18 and resistance pad 16, reference is made to copending application, Serial No. 425,238, filed April 23, 1954, by D. W. Bodle and J. B. Hays, Jr.

As shown in Fig. 2, an outgoing voice-frequency signal transmission path is provided by a compressor 19, a modulator 20, a transmitting amplifier 21, and a band-pass channel filter 22, all connected in tandem transmission relation. The input side of compressor 19 is connected to one pair of conjugate terminals of resistance bridge 13, while the output side of channel filter 22 is connected through a transformer 23 to the carrier transmission line 24. Carrier-frequency oscillations are supplied to modulator 20 from a carrier oscillator 25. To the left of transformer 23, one side of the carrier line is grounded.

High voltage protection for the circuits to the left of transformer 23 against lightning surges on carrier line 24 is provided by a pair of carbon block high voltage protectors 26, a series resistor 27, and two pairs of silicon p-n junction diodes 28 and 29. Carbon block protectors 26 are connected in series across the carrier line side of transformer 23, and their common point is grounded. Resistor 27 is connected in series with the ungrounded side of the carrier line to the left of transformer 23. To the left of resistor 27, the first pair of diodes 28 are oppositely poled and connected in series between resistor 27 and ground. The second diode pair 29 is similarly connected to increase the current-carrying capacity of the diode path. Currents below the carrier band in frequency are blocked by a condenser 30 connected in series between the two halves of the right-hand or carrier line winding of transformer 23, while high frequency voltage surges are attenuated by a condenser 31 connected between the right-hand side of resistor 27 and ground. For more complete details of the operation of this high voltage protection circuit, reference is again made to the copending application of D. W. Bodle and J. B. Hays, Jr.

In the office terminal illutrated in Figs. 1 and 2, a path for incoming signals received from carrier line 24 is provided by a band-pass channel filter 32, a receiving amplifier 33, a demodulator 34, and an expander 35. These units are connected in tandem transmission relation with channel filter 32, the input terminals of which are connected in parallel across carrier line 24 with the output terminals of channel filter 22. The output side of expander 35 is connected to the other pair of conjugate terminals of resistance bridge 13 through T-type resistance pad 36.

The circuits which have already been set forth make up the voice signal paths of the office terminal illustrated in Figs. 1 and 2. In accordance with a principal feature of the invention, additional circuits are provided to code the multiparty-line subscriber ringing information impressed on voice line 11 for transmission over carrier line 24 at a power level comparable to that of the normal voice signals. In addition, circuits are provided to receive and utilize supervisory and dialing signals transmitted over carrier line 24 from the associated outlying carrier terminal.

To detect the presence of a ringing signal on one side or the other of office terminal voice line 11, the left-hand or primary winding of voice line transformer 12 is divided into two equal parts which are joined by a pair of series resistors 40 and 41 connected between them. One side of a D.-C. blocking condenser 42 is connected to the junction point between resistors 40 and 41, and the other side is returned to ground through a resistor 43. A source of a first voice-frequency tone $f_1$ is connected through a suitable coupling condenser 39 to the common point between condenser 42 and resistor 43. A diode 44 and a resistor 45 are connected in series across resistor 43, with diode 44 poled toward the junction of condensers 39 and 42 and resistor 43. Diode 44 forms a switch which closes on negative half cycles of the A.-C. component of a ringing signal voltage appearing between either side of voice line 11 and ground and permits the passage of bursts of the tone $f_1$ during those intervals.

Voice-frequency tone $f_1$ is supplied to the input side of modulator 20 in Fig. 2 by way of a transistor amplifier. The common point between diode 44 and resistor 45 is connected through a coupling condenser 46 to the base electrode of a transistor 47 and through a dropping resistor 48 to a 20-volt negative direct voltage source 49. The emitter electrode of transistor 47 is returned to negative voltage source 49 through a pair of series resistors 50 and 51. The common point between resistors 50 and 51 is returned to ground through a bypass capacitor 52. The base electrode of transistor 47 is connected through a resistor 53 to a 15-volt negative direct voltage source 54. The collector electrode of transistor 47 is connected to the ungrounded side of the voice-frequency signal input circuit to modulator 20.

For ease of reference, the opposite sides of the voice and carrier lines are labelled R and T, respectively, to the "ring" and "tip" terminals of the associated switchboard jacks. In the description which follows, however, a connection stated to be to either the R or the T side of voice line 11 is intended to be understood as being to that side of voice line 11 through the corresponding half of the primary winding of voice line transformer 12.

The T side of voice line 11 is connected directly to the armature of a fast-acting mercury-type relay 55. Relay 55 has both front and back contacts associated with this armature. The front contact is connected to the R side of voice line 11, while the back contact is returned to ground through three series resistors 56, 57, and 58. The mid-point between resistors 56 and 57 is returned to ground through a pair of series bypass condensers 59 and 60, while a source of a second voice-frequency tone $f_2$ is connected through a coupling condenser 61 to the mid-point between resistors 57 and 58.

A pair of oppositely poled silicon p-n junction diodes 62 are connected in series between coupling condenser 61 and one side of a resistor 63, the other side of resistor 63 being grounded. The ungrounded side of resistor 63 is also connected through a coupling condenser 64 to the base electrode of transistor 47.

Diodes 62 are of the type described in the article by G. L. Pearson and B. Sawyer, "Silicon P-N junction alloy diodes," appearing at page 1348 of the November 1952, issue of the Proceedings of the I. R. E., and contain avalanche breakdown regions in their reverse conduction characteristics. The breakdown voltage of each diode is somewhat less than the magnitude of the D.-C. components of the ringing signal voltages normally applied to voice line 11. When relay 55 is unoperated, its armature serves to connect resistors 56, 57, and 58 to the T side of voice line 11. Resistors 56 and 57 and condensers 59 and 60 form a low-pass filter and remove the A.-C. component of any ringing signal on the T side of voice line 11. Oppositely poled diodes 62 serve as a switch which operates to pass the tone $f_2$ whenever either a positive or a negative direct ringing voltage appears on the T side of the line.

The R side of voice line 11 is also returned to ground through a resistor 65 connected in series with a pair of condensers 66. The T side of voice line 11 is returned to ground by way of a resistor 67 connected in series with a pair of condensers 68. A source of still a third voice-frequency tone $f_3$ is connected through a coupling condenser 69 and a resistor 70 to a point between resistor 65 and condensers 66. The junction between coupling condenser 69 and resistor 70 is connected through a crystal diode 71 and a coupling condenser 72 to the base electrode of transistor 47. Diode 71 is poled in the direction toward coupling condenser 72. The common point between diode 71 and coupling condenser 72 is connected through a resistor 73 to a point between resistor 67 and condensers 68 and is also returned to ground through a resistor 74.

Resistors 65, 67, 70, and 73, in cooperation with condensers 66 and 68, form a low-pass filter which removes the major part of the A.-C. component of any ringing signal applied to either side of voice line 11. Diode 71 constitutes a switch which closes and permits tone $f_3$ to pass to the amplifier formed by transistor 47 whenever the T side of voice line 11 is negative with respect to the R side. In other words, diode 71 is a switch which closes when the D.-C. component of a ringing signal applied to voice line 11 is either positive on R or negative on T.

The supervisory functions of the office carrier terminal illustrated in Figs. 1 and 2 are performed by a mercury-type relay 55 which is connected to the output side of receiving amplifier 33 by means of a second transistor amplifier and a detector connected to the output circuit thereof. One side of the output of receiving amplifier 33 is connected to the base electrode of a first transistor 80, while the other side is connected to negative D.-C. supply source 54.

The collector electrode of transistor 80 is grounded, and the emitter electrode is returned through a resistor 81 to 20-volt negative D.-C. supply source, which may be source 49 but which is, for drafting convenience, shown as a separate 20-volt D.-C. source 91. The emitter electrode of transistor 80 is also connected directly to the base electrode of a second transistor 82. The emitter electrode of transistor 82 is connected through a pair of series resistors 83 and 84 to negative voltage supply 91. An equalizing condenser 85 is connected in parallel with resistors 83 and 84, while a bypass condenser 86 is returned to ground from the mid-point between resistors 83 and 84. An inductance 87 is connected between the the collector electrode of transistor 82 and ground.

In order to detect a supervisory signal received from amplifier 33 and passed through transistors 80 and 82, a crystal diode 88 is connected from the collector electrode of transistor 82 to one side of the operating coil of mercury-type relay 55. The other side of the operating coil is grounded, and diode 88 is poled in the direction from transistor 82 toward the operating coil. A pair of condensers 89 are connected in parallel from the ungrounded side of the operating coil of relay 55 to negative voltage supply 91. In order to provide a normal back bias for relay 55, a variable resistor 90 is also connected between the ungrounded side of its operating coil and negative voltage supply source 91.

In cooperation with condensers 89, diode 88 forms a voltage peak detector and supplies a D.-C. signal to the operating coil of relay 55 whenever a carrier-frequency supervising or dialing signal is applied to the input of the amplifier formed by transistors 80 and 82.

Compressor 19, modulator 20, transmitting amplifier 21, channel filter 22, carrier oscillator 25, channel filter 32, receiving amplifier 33, demodulator 34, and expander 35 are the same as those appearing in the previously described copending application of V. J. Hawks, E. K. Van Tassel, and D. C. Weller.

Figure 4:
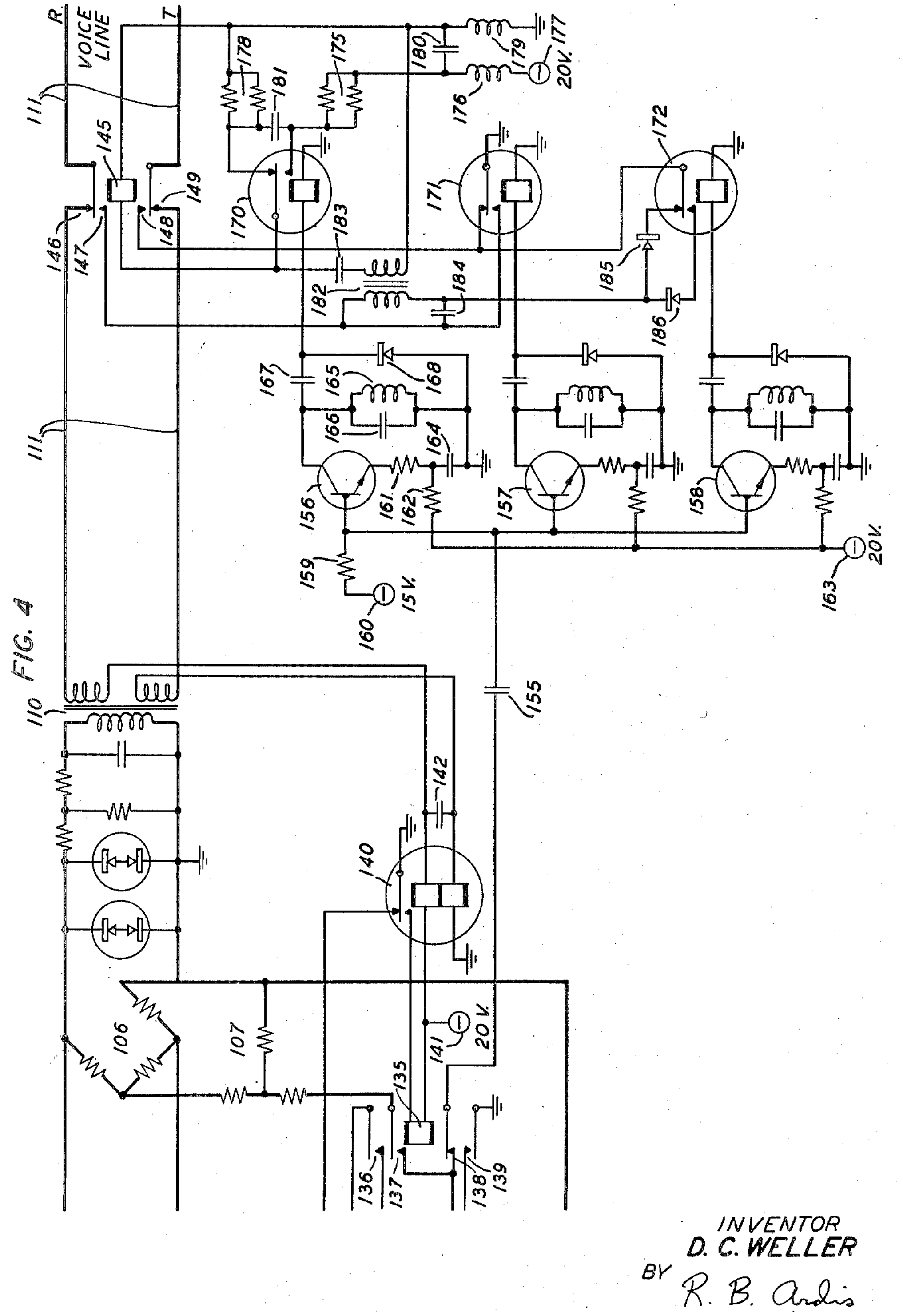

*Outlying carrier terminal—Figs. 3 and 4*

Figs. 3 and 4, taken together, illustrate an outlying satellite carrier terminal embodying features of the invention for use in the rural carrier telephone system disclosed in Fig. 1 of the above-identified copending application of V. J. Hawks, E. K. Van Tassel, and D. C. Weller. For a complete representation of the outlying terminal, Fig. 3 should be placed immediately to the left of Fig. 4, with the leads at the right-hand side of Figs. 3 aligned with those at the left-hand side of Fig. 4.

The outlying carrier terminal is generally pole-mounted and located at the opposite end of carrier line 24 from the office terminal which has just been described. Carrier line 24 is coupled through a carrier line transformer 101 to a band-pass incoming channel filter 102. Connected in tandem transmission relation with channel filter 102 in the incoming signal path of the outlying terminal are a receiving amplifier 103, a demodulator 104, and an expander 105. Filter 102, amplifier 103, demodulator 104, and expander 105 correspond to, and are substantially the same as, filter 32, amplifier 33, demodulator 34, and expander 35, respectively, in the office carrier terminal illustrated in Figs. 1 and 2. When no subscriber's telephone set associated with the outlying terminal is in its off-hook condition, the output side of expander 105 is connected to one pair of the conjugate terminals of a four-terminal resistance bridge 106 through a resistance pad 107. The terminals forming one arm of resistance bridge 106 are coupled through a voice line transformer 110 to the outlying terminal subscriber voice line 111.

Between carrier line 24 and band-pass channel filter 102, the outlying carrier terminal illustrated in Figs. 3 and 4 is provided with a lightning surge protection circuit which is substantially the same as that shown in Fig. 2. Between resistance bridge 106 and voice line transformer 110, the outlying terminal is provided with a high voltage protection circuit substantially the same as that shown between resistance bridge 13 and transformer 12 in Fig. 1.

The outlying carrier terminal of Figs. 3 and 4 is provided with an outgoing signal path between resistance bridge 106 and carrier line 24 which is made up of a compressor 125, a modulator 126, a transmitting amplifier 127, and a band-pass channel filter 128, all connected in tandem transmission relation. A carrier oscillator 129 supplies carrier waves to modulator 126. All of these last-mentioned elements are substantially the same as the corresponding elements in the outgoing signal path illustrated in Fig. 2.

Between expander 105 and resistance pad 107, the outlying terminal illustrated in Figs. 3 and 4 is provided with a supervisory relay 135. Relay 135 is a single coil, four-armature, slow-release relay. Front contacts 136 and 137 are associated with the first two of the armatures of relay 135, respectively, back contact 138 is associated with the third armature, and front contact 139 is associated with the fourth. Contact 136 and its associated armature are connected in series with the carrier line between amplifier 127 and channel filter 128 in Fig. 3. Contact 137 is connected to the output side of expander 105, and its associated armature is connected directly to the ungrounded side of resistance pad 107. Contact 139 is connected to the "ground" leads of compressor 125, transmitting amplifier 127, and carrier oscillator 129, while the armature associated with contact 139 is connected to ground. Back contact 138 is connected directly to front contact 137.

A fast-acting mercury-type pulse repeating relay 140 has its armature grounded and its back contact connected to the high potential side of the carrier line between modulator 126 and amplifier 127 in Fig. 3. The front contact of relay 140 is connected through the operating coil of supervisory relay 135 to a 20-volt negative D.-C. potential source 141.

The R side of outlying terminal voice line 111 is connected through half of the right-hand or secondary winding of transformer 110 to one side of one of the two operating coils of pulse repeating relay 140. The other side of this operating coil is connected directly to negative D.-C. source 141. The T side of voice line 111 is connected through the other half of the secondary winding of transformer 110 and the second operating coil of relay 140 to ground. A condenser 142 is connected directly between the two halves of the secondary winding of transformer 110.

In the upper right-hand corner of Fig. 4, the continuity of voice line 111 is determined by a two-armature slow-release voice line relay 145. The first of these armatures has an associated back contact 146 and front contact 147, while the other has an associated front contact 148 and back contact 149. When relay 145 is in its unoperated condition, continuity of voice line 111 is maintained through back contacts 146 and 149.

The armature of slow-release supervisory relay 135 associated with back contact 138 is connected through a coupling condenser 155 to the base electrodes of each of three transistors 156, 157, and 158. These three transistors and their associated elements form three amplifiers which serve to amplify respective ones of the voice-frequency ringing signal tones $f_1$, $f_2$, and $f_3$ received from expander 105, and their output circuits include band-pass filters adapted to select a respective one of these three tones. Except for element values, the three amplifiers are substantially identical. For this reason, only the one which includes transistor 156 is described.

The base electrode of transistor 156 is returned through a resistor 159 to a 15-volt negative D.-C. supply source 160. The emitter electrode is returned through a pair of series resistors 161 and 162 to a 20-volt negative D.-C. potential source which may be source 141 but which, for drafting convenience, is shown as a separate source 163. The junction point between resistors 161 and 162 is bypassed to ground by a condenser 164. An inductance coil 165 and a capacitor 166 are connected in parallel between the collector electrode of transistor 156 and ground to provide the desired filtering action. A coupling condenser 167 is connected between the collector electrode of transistor 156 and ground through the operating coil of a fast-acting mercury-type relay 170. A crystal diode 168 is returned to ground from the junction point between condenser 167 and the operating coil of relay 170.

Inductance coil 165, condenser 166, and condenser 167 in the output circuit of the amplifier which includes transistor 156 acts as a band-pass filter which selects the voice-frequency tone $f_1$. Diode 168 is poled toward the junction point between condenser 167 and the operating coil of relay 170 and cooperates with the inductance of the relay operating coil to form a current peak detector. A D.-C. signal proportional to the amplitude of the tone $f_1$ as passed through the transistor amplifier is thus applied to the operating coil of relay 170.

The elements associated with transistor 157 are substantially the same as those associated with transistor 156, with the exception that the band-pass filter in the amplifier output circuit is tuned to the tone $f_2$ instead of $f_1$, and the output of the detector is applied to the operating coil of a second fast-acting mercury-type relay 171. The circuit associated with transistor 158 is also the same as that associated with transistor 156, but here the filter is tuned to the tone $f_3$, and the output of the detector is applied to the operating coil of a third fast-acting mercury-type relay 172.

The front contact of the first relay 170 is connected through a pair of small parallel resistors 175 and an inductance coil 176 to a 20-volt negative D.-C. potential source which again may be source 141 but which, for drafting convenience, is shown as a separate source 177. The back contact of relay 170 is returned to ground through a second pair of small parallel resistors 178 and a second inductance coil 179. A first condenser 180 is connected between the corresponding high potential sides of coils 176 and 179, and a condenser 181 is connected directly between the front and back contacts of relay 170. Resistors 175 and 178 serve to limit large surges of current which are drawn from the D.-C. power supply 177 when momentary continuity is established between the front and back contacts of relay 170, and condenser 181 helps provide contact protection. Inductance coils 176 and 179 and condenser 180 form a low-pass noise suppression filter for D.-C. power supply 177.

The operating coil of slow-release voice line relay 145 is connected between the armature of relay 170 and the ungrounded side of inductance coil 179. The primary winding of a 20-cycle ringing transformer 182 is connected in series with a D.-C. blocking condenser 183 in another path between the armature of relay 170 and the ungrounded side of inductance coil 179.

The secondary winding of ringing transformer 182 has one side connected directly to front contact 147 of voice line relay 145. A smaller condenser 184 is connected across this secondary winding to reduce current spikes, and the other side of the winding is connected to the junction between two crystal diodes 185 and 186.

Front contact 148 of voice line relay 145 is connected to the back contact of second mercury-type relay 171 and to the armature of third mercury-type relay 172. The armature of relay 171 is grounded, and the front contact is connected to contact 147 of voice line relay 145. The back and front contacts of relay 172 are connected, respectively, to the secondary winding of transformer 182 through crystal diodes 185 and 186. Diode 185 is poled in the direction toward its associated back contact, while diode 186 is poled in the direction away from the front contact.

*Operation of office and outlying terminals—Figs. 1, 2, 3, and 4*

The operation of the embodiment of the invention formed by the carrier terminals illustrated in Figs. 1, 2, 3, and 4 may best be explained by describing the progress first of a call from the central office to a subscriber served from the outlying terminal and second of a call from the subscriber to the central office. In general, calls will, of course, originate at a subscriber's set on this or some other line. However, the operation of the system is substantially the same regardless of the origin of the call. In the description which follows, it is assumed for simplicity that the multiparty subscriber line leading from voice line 111 in Fig. 4 provides service to four subscribers. With such an arrangement, the terminals illustrated provide four-party full-selective ringing, i. e., ringing in which only the subscriber set called is activated. For an eight-party line, eight-party semiselective ringing is provided. In such an arrangement, each subscriber hears no more than one other ring, and different codes, made up of combinations of long and short rings, are used to designate the called subscriber.

*Call from central office to subscriber*

Figs. 5A through 5D are provided to aid in the understanding of the transmission of subscriber ringing information from the office terminal of Figs. 1 and 2 to the outlying terminal of Figs. 3 and 4. Fig. 5A is a chart showing the particular ringing signals which may be applied by a telephone office to the input of a carrier telephone system embodying the invention. The four parties on the line are designated A, B, C, and D, respectively, and each is designated by a ringing signal which is either positive or negative on one side or the other of the line. A check mark in the column for one of the voice-frequency ringing tones $f_1$, $f_2$, and $f_3$ designates the presence of the particular tone in that instance.

Fig. 5B illustrates the wave-forms of the standard ringing signal voltages generated at the telephone central office and applied to voice line 11 at the office terminal. The first column of Fig. 5B illustrates the signal used to ring party A. The voltage applied to the voice line is a 20-cycle voltage to ground on the R side of the line superimposed upon a positve D.-C. component. The T side of the line is grounded. The second, third, and fourth columns of Fig. 5B illustrate the ringing voltage wave-form applied to the line when parties B, C, and D, respectively, are to be rung. The wave-forms are generally similar to those shown in the first column, with the exception that the D.-C. components are sometimes negative rather than positive and that the 20-cycle A.-C. components are applied sometimes to the T side of the line rather than to the R side.

Fig. 5C illustrates the voice-frequency tones $f_1$, $f_2$, and $f_3$ passed to modulator 120 in the office carrier terminal of Figs. 1 and 2 for the various applied ringing signals. These tones are transmitted on a carrier-frequency basis to the outlying terminal illustrated in Figs. 3 and 4, where they are demodulated and used in the form illustrated to recreate a suitable ringing signal on the outlying terminal voice line 111.

Fig. 5D illustrates the ringing voltages generated at the outlying terminal of Figs. 3 and 4 in response to the received voice-frequency tones illustrated in Fig. 5C.

Prior to a call from the central office to an outlying subscriber, mercury-type relay 55 in Fig. 1 is in its unoperated condition, causing the T side of voice line 11 to be connected to diodes 62. Slow-release supervisory relay 135 in the outlying terminal of Figs. 3 and 4 remains unoperated, permitting the output side of the expander 105 to be coupled through contact 138 to the operating coils of relays 170, 171, and 172. In addition, transmitting amplifier 127, carrier oscillator 129, and compresor 125 in Fig. 3 remain temporarily disabled because of the absence of a ground connection through contact 139. The circuit through contact 136 remains open, leaving the output of transmitting amplifier 127 disconnected from the carrier line. The circuit through contact 137 also remains open, leaving expander 105 disconnected from resistance bridge 106. Pulse repeating relay 140 remains unoperated, leaving the output of modulator 126 in Fig. 3 shorted out to ground. Slow-release voice line relay 145 is in its unoperated condition and preserves the continuity of voice line 111 in Fig. 4.

When a subscriber served from the outllying terminal is to be rung, equipment at the telephone central office generates one of the standard ringing signals illustrated in Fig. 5B and applies it to voice line 11 at the upper left-hand corner of Fig. 1. In general, the ringing signals are of longer duration than those illustrated in Fig. 5B, but the wave-forms shown serve adequately to illustrate the principles involved.

When party A is to be rung, the ringing signal applied to voice line 11 is, as shown in the first column of Fig. 5B, positive on R. Diode 44 is a switch which closes on negative half cycles of the A.-C. component of the ringing voltage and passes bursts of the tone $f_1$ during those intervals, as illustrated in the first row of the first column of Fig. 5C. These bursts of the tone $f_1$ are amplified and applied to the voice-frequency signal input side of modulator 20. Since the ringing signal is between R and ground, nothing is applied through the back contact of relay 55 to diodes 62. The tone $f_2$, therefore, does not flow and is not applied to modulator 20. Since the D.-C. component on R is positive and T is grounded, the T side of voice line 11 is negative with respect to the R side, satisfying the condition for the operation of the switch formed by diode 71. Since diode 71 is thus provided with a low impedance, the tone $f_3$ is passed and applied to the input side of modulator 20.

When party A is to be rung, the tones $f_1$ and $f_3$ are applied in this manner to modulator 20 and transmitted on a carrier-frequency basis over carrier line 24 to the outlying terminal. At the outlying terminal, the tones $f_1$ and $f_3$ are recovered from demodulator 104 and passed through expander 105 and contact 138 of relay 135 to transistors 156, 157, and 158. The circuit associated with transistor 156 selects the bursts of the tone $f_1$, rectifying them, and applies them to the operating coil of relay 170. The circuit associated with transistor 158 does the same with respect to the tone $f_3$ and applies it to the operating coil of relay 172. Relay 171 remains unoperated. With each burst of the tone $f_1$, relay 170 closes and connects a negative potential from source 177 across the operating coil of voice line relay 145. Relay 145 then operates and, since it is of the slow-release variety, remains closed until bursts of the tone $f_1$ cease to be received. When relay 145 is operated, the R side of voice line 11 is connected through contact 147 to the secondary winding of ringing transformer 182. The T side of voice line 111 is connected through contact 148 to ground, since relay 171 remains open.

Since relay 172 is operated, the other side of the secondary winding of transformer 182 is connected through diode 186 to the T side of voice line 111. As explained before, since relay 171 remains open, the T side of voice line 111 is connected directly to ground. When relay 170 is closed, a direct potential is thus applied between the R side of voice line 111 and ground. Because of the polarity of diode 186, this voltage is positive.

Between bursts of the voice tone $f_1$, relay 170 returns to its open position and removes the potential from the primary winding of ringing transformer 182. Voice line relay 145, however, remains closed until bursts of the tone $f_1$ cease altogether.

In this manner, the voltage wave-form shown in the first column of Fig. 5D is generated and applied to the R side of voice line 11 for transmission over the multiparty subscriber line. The resulting wave-form is generally similar to the standard ringing signal originally applied to the voice line at the central office and serves to select the subscriber set which it is desired to ring.

When party B is to be rung, the operation of the carrier terminals of Figs. 1 through 4 is the same that has just been described except that the tone $f_3$ is not transmitted. Since the ringing signal is negative on R, T is not negative with respect to R, and the switch formed by diode 71 in Fig. 1 remains closed. When only the tone $f_1$ is received at the outlying terminal, relays 171 and 172 both remain unoperated. Diode 185 is thus connected in series between the secondary winding of transformer 182 and ground instead of diode 186, with the result that the signal applied to outgoing voice line 111 is that illustrated in the second column of Fig. 5D.

When party C is called from the office terminal illustrated in Figs. 1 and 2, the ringing signal applied to voice line 11 is that illustrated in the third column of Fig. 5B and is positive on T. Diode 44 operates as before to pass pulses of the tone $f_1$ during negative half cycles of the A.-C. component of the ringing signal. Since the ringing signal is on the T side of voice line 11, it is applied through the back contact of relay 55 to diodes 62. The avalanche breakdown voltage of each diode is chosen so that breakdown occurs whenever the applied voltage is of the order of magnitude of the D.-C. component of a standard ringing signal. Since in the example at hand the ringing voltage is positive on T, the diode normally presenting a high impedance is biased beyond its avalanche breakdown point, and the resulting low impedance permits the tone $f_2$ to flow. Since the ringing signal is positive on T, diode 71 continues to present a high impedance to the tone $f_3$, and $f_3$ is not applied to modulator 20.

At the outlying terminal, the tones $f_1$ and $f_2$ are recovered from demodulator 104, and corresponding direct voltages are applied to the operating coils of relays 170 and 171. Relay 170 operates on a per cycle basis in the manner already described. The operation of relay 171 serves to apply a ground connection to the R instead of the T side of voice line 111. Since relay 172 remains open, diode 185 stays connected between the secondary winding of transformer 182 and the T side of voice line 111. The resulting ringing signal applied to voice line 111 and transmitted over the subscriber loop is that illustrated in the third column of Fig. 5D.

The final ringing example occurs when party D is called. As shown in the fourth column of Fig. 5B, the standard ringing signal applied to voice line 11 of the office terminal is negative on T. Such a ringing signal causes all three tones $f_1$, $f_2$, and $f_3$ to flow, as shown in the fourth column of Fig. 5C. These tones are recovered at the outlying terminal and cause D.-C. signals to be applied to the operating coils of all three relays 170, 171, and 172. Relay 171 connects the R side of voice line 111 to ground, and relay 172 connects diode 186 between the secondary winding of transformer 182 and the T side of voice line 111. The resulting ringing signal which is applied to voice line 111 is that shown in the fourth column of Fig. 5D.

The operation of the carrier system illustrated in Figs. 1 through 4 after the called subscriber answers is the same regardless of the type of ringing signal applied. Before the called subscriber answers, the switch-hook of his subset (and those of all the subscribers on the line) is in its on-hook condition, causing substantially an open-circuit to be placed across subscriber voice line 111. When the called subscriber answers, he lifts his switch-hook, causing substantially a short-circuit to be placed across voice line 111. During the interval between rings, the line relay 145 falls back so that the total impedance in the circuit through voice line 11, the contacts of relay 145, the operating coils of pulse repeating relay 140, and D.-C. supply source 141 is small, permitting source 141 to set up currents in both operating coils of relay 140. Relay 140 operates, removing the short-circuit from the output side of modulator 126 and providing a path to ground from source 141 and the operating coil of relay 145. Supervisory relay 135 then operates, closing the circuit between transmitting amplifier 127 and outgoing channel filter 128 and connecting expander 105 to resistance bridge 106. At the same time, a ground connection is supplied to compressor 125, amplifier 127, and oscillator 129, activating them. Expander 105 is disconnected from transistors 156, 157, and 158, temporarily disabling the circuits for applying ringing signals to the outgoing voice line 111. Once the ringing-tone circuits are disabled, current can no longer be passed through the operating coil of voice line relay 145, and the continuity of voice line 111 is maintained.

When the ground connection is established for oscillator 129, carrier begins to be transmitted through outgoing channel filter 128 over carrier line 124 to the office terminal. At the office terminal, this carrier is received through incoming channel filter 32 and receiving amplifier 33. It is amplified by transistors 80 and 82 and their associated elements and detected by diode 88. A D.-C. signal results which is applied across the operating coil of relay 55, causing relay 55 to operate and a short-circuit to be placed between the two halves of the primary winding of voice line relay 12. The operation of relay 55 thus removes from the line the apparatus for supplying voice-frequency tones $f_1$, $f_2$, and $f_3$ and can also, if desired, be utilized to cause a lamp to light at the central office. The lighted lamp indicates that the called subscriber has answered and that the system is ready for normal voice transmission. During normal voice transmission, the standard "talking battery," a 24-volt negative D.-C. supply source which is applied to voice line 11 to supply power to the subscriber set transmitter, is not actually used for that purpose. In order to avoid overloading the transistor circuits in the terminal and repeater equipment, power for such purposes is not transmitted over the carrier line. However, when this voltage is applied to voice line 11 at the office terminal, it serves to back-bias diode 71 and prevent tone $f_3$ from being applied to modulator 20 during talking intervals. Relay 55 prevents any unwanted transmission of the tones $f_1$ and $f_2$ during talking intervals. At the outlying terminal, transmitter power is supplied to the called subscriber set over voice line 111 from D.-C. source 141.

When the call is completed, the subscriber hangs up and restores substantially an open-circuit across subscriber voice line 111. This causes relays 140 and 135 to release and the transmitting portion of the outlying terminal to be temporarily disabled once again. Carrier ceases to arrive at the outlying terminal over carrier line 24, causing relay 55 to release, and the apparatus for applying voice-frequency tones $f_1$, $f_2$, and $f_3$ is restored across office terminal voice line 11. The system is then ready to handle another call.

*Call from subscriber to central office*

When a call is originated on the subscriber voice line 111 leading from the outlying terminal illustrated in Figs.

3 and 4, the apparatus illustrated in Figs. 1 through 4 for transmitting ringing information over the carrier line is not activated. Before the subscriber places his call, the system is in the same condition as it is both before and after a call from the central office to the subscriber. When the subscriber lifts his switch-hook to place a call, he causes relays 140 and 135 to operate in the manner already described. The transmitting portions of the outlying terminal are activated, and carrier is transmitted from oscillator 129 over carrier line 24 to the office terminal. At the office terminal, this carrier is detected and operates relay 55, temporarily disabling the office ringing-information transmitting apparatus, placing a short-circuit between the two halves of the primary winding of voice line transformer 12, thereby causing the switching office to prepare to receive dial pulses. When the subscriber dials, his subset generates dial pulses by momentarily open-circuiting voice line 111 during pulsing intervals. Dial pulses are represented by intervals in which voice line 111 is open-circuited at the subscriber end. During these intervals, pulse repeating relay 140 releases, causing the output side of modulator 126 to be short-circuited. Since supervisory relay 135 is of the slow-release variety, it remains operated. In this manner, the carrier wave transmitted over carrier line 24 from the outlying terminal is periodically interrupted, with each interruption representing a dial pulse.

At the office terminal illustrated in Figs. 1 and 2, these interruptions in the received carrier wave cause mercury relay 55 to release with each dial pulse. Relay 55 removes the short-circuit between the two halves of the primary winding of office terminal voice line transformer 12 during dial pulses. The resulting opening and closing of voice line 11 at the office terminal activates switching equipment at the office terminal just as if the dial pulses had been applied directly to voice line 11 by the calling subscriber's telephone set.

Once the desired connection is made, the call from the subscriber to the central office then progresses in the usual manner. At the conclusion of the call, the calling subscriber restores his switch-hook to its on-hook position and disables, once again, the transmitting portions of the outlying terminal.

Reverting calls in the system illustrated in Figs. 1 through 4 are handled in the usual manner, with the calling subscriber first lifting his switch-hook, dialing the desired number, and then restoring his switch-hook to its on-hook condition until the called subscriber answers. The operation of the system in the direction of the outlying terminal to the central office and back from the central office to the outlying terminal is the same as has just been described.

The embodiment of the invention illustrated in Figs. 1 through 4 is particularly adapted for four-party full-selective or eight-party semi-selective ringing. Lower grades of ringing service may, however, be provided in this and other embodiments if desired (e. g., when the central office is not equipped to provide the more complex ringing signals or the subscribers desire a cheaper grade of service). Thus, divided code ringing may be provided through the use of only tones $f_1$ and $f_2$, and full code ringing may be provided through use of tone $f_1$ alone. With the former, each ring is heard by all parties on the line. Such ringing arrangements do, however, permit the omission from both office and outlying terminals of the circuits associated with the unused tone or tones.

The arrangements which have just been described will, it should be noted, serve equally well whether they are used with an automatic or with a manual central office. In an automatic central office, the various switching functions are performed automatically in response to the various supervisory and dialing signals, while in a manual central office, a supervisory signal causes a lamp to light and the switching functions are performed manually.

*Alternative office carrier terminal—Figs. 1, 2, and 6*

An alternative office terminal embodying features of the invention is shown in Figs. 1 and 2 as modified by Fig. 6. In the alternative arrangement, Fig. 6 is substituted in Fig. 1 for the $f_3$ control circuit along the line A—A. In addition, resistance pad 36 is eliminated from the incoming signal path between expander 35 and resistance bridge 13 for reasons of simplicity. Otherwise, the alternative office terminal is the same as that previously described in connection with Figs. 1 and 2.

The circuit elements in Fig. 6 are the same as those of the $f_3$ control circuit for which it is substituted. However, instead of being connected to the side of diode 71 adjacent to resistor 74, resistor 73 is connected to the side of diode 71 adjacent resistor 70 and coupling capacitor 69. As a result, diode 71 forms a switch which passes voice-frequency tone $f_3$ whenever a positive D. C. ringing signal component appears on either the R side or the T side of voice line 11.

*Alternative outlying carrier terminal—Figs. 3 and 7*

An alternative outlying carrier terminal embodying features of the invention and intended for use in association with the alternative office carrier terminal which has just been described is illustrated by Figs. 3 and 7. For a complete representation of this alternative terminal, Fig. 7 should be placed immediately to the right of Fig. 3, with the leads at the left-hand side of Fig. 7 in alignment with those at the right-hand side of Fig. 3.

The voice message transmission paths of the alternative outlying terminal are the same as those in the outlying terminal previously described in connection with Figs. 3 and 4 and will not be redescribed. In addition, supervisory relay 135, pulse repeating relay 140, and the three transistor amplifiers and their associated selection filters and detectors for the three voice-frequency tones $f_1$, $f_2$ and $f_3$ are the same as in Fig. 4 and will not be redescribed. Also, as before, the rectified output of the $f_1$ transistor amplifier is supplied to the operating coil of relay 170, that of the $f_2$ amplifier is supplied to the operating coil of relay 171, and that of the $f_3$ amplifier is supplied to the operating coil of relay 172.

At the right-hand side of Fig. 7, voice line 111 is connected across the right-hand or secondary winding of transformer 110 by a pair of slow-release relays 201 and 202. Relay 201 is a four-armature relay arranged with four front contacts and two back contacts. The first back contact 203 is normally connected through its associated armature to the R side of voice line 111, while the other back contact 204 is normally connected through its armature to the T side of the line. A front contact 205 is associated with the R armature of relay 201, and a front contact 206 is associated with the T armature. Front contact 206 is grounded. The remaining two armatures of relay 201 have only front contacts 207 and 208 associated with them.

Relay 202 is substantially identical with relay 201 and also has four armatures, two of which have associated front and back contacts and the other two of which have only associated front contacts. One of the two-contact armatures of relay 202 is connected to back contact 204 of relay 201, and its associated back contact 209 is connected directly to the T side of the divided secondary winding of transformer 110. The other of the two-contact armatures of relay 202 is connected to back contact 203 of relay 201, and its associated back contact 210 is connected directly to the R side of the secondary winding of transformer 110. The first of the two-contact armatures of relay 202 is provided with a front contact 211, while the second of the two-contact armatures is provided with a grounded front contact 212. The remaining two armatures of relay 202 are associated only with front contacts 213 and 214, respectively.

The armatures of relay 201 associated with front contacts 207 and 208 and the armatures of relay 202 associated with front contacts 213 and 214 are all connected to a 20-volt negative D.-C. supply source, which may be source 141 but which, for drafting convenience, is shown as a separate D.-C. source 215. Contact 205 of relay 201 and contact 211 of relay 202 are connected together through a small resistor 216 to the back contact of relay 170 and through a low-pass filter composed of a series inductance 217 and a shunt capacitor 218 to the armature of relay 172. The armature of relay 170 is grounded, and its front contact is connected to the armature of relay 171. The back contact of relay 171 is connected through the operating coil of slow-release voice line relay 201 to negative D.-C. source 215. The front contact of relay 171 is connected through the operating coil of voice line relay 202 to negative D.-C. source 215.

The front and back contacts of relay 172 are connected to respective sources of positive and negative potential, respectively, supplied from the transistor relaxation oscillator in the lower left-hand corner of Fig. 7. This oscillator forms the basis of and is described in more detail in applicant's copending application Serial No. 462,153, filed October 14, 1954, and is composed of a pair of junction transistors 221 and 222 of respectively opposite conductivity types. By way of example, transistor 221 is a low-power junction transistor of the n-p-n type, while transistor 222 is a high-power junction transistor of the p-n-p type.

The base electrode of transistor 221 is returned to ground through a large resistor 223, while the emitter electrode is connected through two smaller series resistors 224 and 225 to the ungrounded side of resistor 223. The collector electrode of transistor 221 is connected to the base electrode of transistor 222 through a resistor 226 which is, in turn, shunted by a capacitor 227.

The emitter electrode of transistor 222 is grounded and the base electrode is returned to ground through a resistor 228. A path between the collector electrode of transistor 222 and the base electrode of transistor 221 is provided by a crystal diode 229, a resistor 230, and a coupling condenser 231. Diode 229 and condenser 231 are connected in series between the base electrode of transistor 221 and the collector electrode of transistor 222, with diode 229 poled in the direction toward the latter. Resistor 230 is connected in shunt across diode 229.

The primary winding 232 of an output transformer 233 is connected from the collector electrode of transistor 222 to the junction between resistors 224 and 225, and the latter point is connected directly to front contacts 207 and 208 of relay 201 and to front contacts 213 and 214 of relay 202 in order to provide D.-C. operating potential for the oscillator when either relay is closed. The secondary winding of transformer 233 is divided into two equal portions 234 and 235. The mid-point between windings 234 and 235 is grounded, while the opposite ends of the windings are connected to the front and back contacts, respectively, of relay 172 by a full wave rectifier composed of crystal diodes 236, 237, 238, and 239. Diodes 236 and 237 are poled in the direction away from relay 172 and are connected from the back contact of relay 172 to the ungrounded ends of windings 234 and 235, respectively. Diodes 238 and 239 are poled in the direction toward relay 172 and are connected from the front contact of relay 172 to the ungrounded ends of windings 234 and 235, respectively. In this manner, 236 and 237 supply a negative potential to the back contact of relay 172, while diodes 238 and 239 supply a positive potential to the front contact.

*Operation of office and outlying terminals—Figs. 1, 2, 3, 6, and 7*

The detailed operation of the alternative office and outlying carrier terminals illustrated in Figs. 1, 2, 3, 6, and 7 may also best be set forth by describing the progress first of a call from the central office to a subscriber and second of a call from a subscriber to the central office. Since, for the most part, the operation is the same as with the terminals shown by the combination of Figs. 1, 2, 3, and 4, the present description is largely confined to the respects in which the present embodiment of the invention differs from the one which has already been described.

*Call from central office to subscriber*

A principal difference between the operation of the present office terminal in the present example and that described previously is that a somewhat different tone code is used. Fig. 8A is a chart setting forth this different ringing code. As before, a check mark in a tone column indicates the presence of a particular tone in each instance.

Fig. 8B is the same as Fig. 5B and illustrates the wave-forms of the ringing voltages applied by the standard central office equipment to the office terminal of Figs. 1, 2, and 6. As before, in a four-party full-selective system, each party is rung by a different one of the four ringing signal combinations. Reading from left to right in Fig. 8B, the wave-forms illustrated are supplied to the office carrier terminal to ring parties A, B, C, and D, respectively.

Fig. 8C illustrates the voice-frequency tones transmitted to modulator 20 in Fig. 2. As before, these tones are used to modulate the outgoing carrier wave and to convey the appropriate ringing information to the outlying terminal.

Fig. 8D illustrates the ringing-voltage wave-forms recreated from the received ringing signal voice tones at the outlying terminal pictured in Figs. 3 and 7.

The principal difference in the operation of the office terminal in the present example is with regard to the $f_3$ switching circuit illustrated in Fig. 6. In the present example, diode 71 in Fig. 6 passes frequency $f_3$ to the amplifier formed by transistor 47 and its associated elements whenever either T or R is positive with respect to ground. Thus, as illustrated in Fig. 8C, a positive ringing signal on R causes tones $f_1$ and $f_3$ to flow, a negative ringing signal on R causes only $f_1$ to flow, a positive ringing signal on T causes tones $f_1$, $f_2$, and $f_3$ to flow, and a negative ringing signal on T causes tones $f_1$ and $f_2$ to flow.

While the subscriber telephone set is still in its on-hook condition, the carrier and sidebands representing the voice-frequency ringing tones transmitted by the office terminal of Figs. 1, 2, and 6 are received at the carrier side of the outlying terminal illustrated in Figs. 3 and 7. There, they pass through incoming channel filter 102 and receiving amplifier 103 to demodulator 104. The reconstructed voice tones then, as in the previous example, pass through expander 105 and through back contact 138 of supervisory relay 135 to the input sides of the amplifiers associated with relays 170, 171, and 172. These amplifiers, as before, pass tones $f_1$, $f_2$, and $f_3$, respectively, to the operating coils of the relays.

When tone $f_1$ is present in the outlying terminal of Figs. 3 and 7, relay 170 is operated, completing the connection to ground through source 215 and the operating coil of relay 201. Relay 201 operates, disconnecting voice line 111 from transformer 110 and connecting contact 205 of relay 201 to the R side of the line. The T side of the line is grounded by contact 206. Since relay 172 remains unoperated, its armature and back contact connect the R side of voice line 111 to the negative terminal of the full-wave rectifier in the lower left-hand corner of Fig. 7. Since relay 201 is a slow-release relay, it remains operated throughout the duration of the ring. Relay 170, however, is a fast-acting mercury-type relay which operates on a per-cycle rather than on a per-ring basis. Since tone $f_1$ is applied to the operating coil of relay 170 in bursts, relay 170 is operated at a rate corresponding to the repetition rate of the bursts. In the presence of a burst of tone $f_1$, relay 170 is operated, causing its armature to move to its front contact. Between bursts, however, the armature returns to its back contact and supplies substantially a short-circuit to ground from the R side of voice line 111. The ringing signal recreated on the voice line 111 is composed of a ringing frequency (e. g., 20-cycle) A.-C. wave superimposed upon D.-C. The second column of Fig. 8D illustrates the recreated negative ringing signal on R.

Tones $f_1$ and $f_3$ are transmitted to transistors 156, 157, and 158 when the ringing signal to be recreated on voice line 111 is positive on R. The bursts of the tone $f_1$ operate relay 170 in the manner which has been described, but tone $f_3$ operates relay 172, causing its armature to move to its front contact and supply a positive D.-C. potential to the R side of voice line 111. The resulting ringing-voltage waveform is that illustrated in the first column of Fig. 8D and is a positive voltage on R.

When, as shown in the third column of Fig. 8C, all three voice-frequency ringing tones are applied to the outlying carrier terminal illustrated in Figs. 3 and 7, relays 170 and 172 both operate in the manner described. The presence of tone $f_2$ operates relay 171 and causes the front contact of relay 170 to be connected to the operating coil of relay 202 instead of that of relay 201. As a result, relay 201 is released, and its respective back contacts 203 and 204 are once again connected to the R and T sides, respectively, of voice line 111. Relay 202, however, is now operated and voice line 111 remains disconnected from transformer 110. The R side of voice line 111 is grounded, and the T side is supplied with a potential the polarity of which is determined by the position of the armature 172. In the presence of all three tones, relay 172 is closed, and its armature supplies a positive potential to the R side of the line. The resulting ringing-voltage wave-form appearing on voice line 111 is that illustrated in the third column of Fig. 8D.

The final possibility is that of the presence only of tones $f_1$ and $f_2$. As shown in the fourth column of Fig. 8C, these tones are provided when the ringing signal to be reconstructed is negative on T. When tones $f_1$ and $f_2$ are present, relay 170 operates in the manner already described and relay 171 closes to connect the operating coil of relay 202 to the front contact of relay 170. The operating coil of relay 201 is disconnected. The resulting recreated ringing signal illustrated in the fourth column of Fig. 8D is provided by the ground connection on the R side of voice line 111 and the connection through contact 211 from the R side of voice line 111 through the back contact of relay 172 to the negative side of the full-wave rectifier constituted by diodes 236, 237, 238, and 239.

When the called subscriber answers, his telephone switch-hook is lifted, and substantially a short-circuit is placed across the subscriber voice line 111 leading from the outlying terminal. Between rings, the line relay used falls back, leaving voice line 111 connected directly across the secondary winding of transformer 110, and D.-C. source 141 causes a current to flow in the operating coil of pulse repeating relay 140. Relay 140 operates in the manner described in connection with Figs. 1, 2, 3, and 4 and closes a circuit including the operating coil of supervisory relay 135 and D.-C. source 141. Source 141 remains connected across voice line 111 by way of the secondary winding of transformer 110 to power the subscriber telephone set transmitter in use on the line. Supervisory relay 135 in Fig. 7 operates in the same manner as it does in Fig. 4 and breaks the connection to the ringing tone transistor amplifiers and activates compressor 125, transmitting amplifier 127, and carrier oscillator 129. In addition, it closes the open-circuit between transmitting amplifier 127 and channel filter 128 in Fig. 3 and connects the output of expander 105 to resistance bridge 106.

In this manner, spurious ringing signals caused, perhaps, by lightning are prevented from reaching the subscriber when his telephone set is in its off-hook condition. Relays 201 and 202 are locked open and the transmitting side of the outlying terminal is ready for operation.

When the conversation is completed, the subscriber hangs up as before, restoring his telephone subset to its on-hook condition. A substantially open-circuit is then restored across voice line 111, causing relays 135 and 140 to be released. The system is then ready for the transmission of further ringing signals.

*Call from subscriber to central office*

The operation of the combination of equipment illustrated in Figs. 1, 2, 3, 6, and 7 for a call originated by a subscriber serviced from the outlying terminal shown is substantially the same as the operation of the equipment shown in Figs. 1, 2, 3, and 4 and will not be redescribed.

It is to be understood that the arrangements which have been described are illustrative of the application of the principles of the invention. Numerous other embodiments may be devised by those skilled in the art without departing from the spirit and scope of the invention.

What is claimed is:

1. In a telephone system for transmission between a balanced voice-frequency line at an office terminal and a balanced multiparty voice-frequency line at an outlying terminal, an arrangement for transmitting a subscriber ringing signal in the form of low-frequentcy alternating current superimposed upon direct current between one side of the voice line and ground from said office terminal to said outlying terminal which includes, at said office terminal, means to transmit a first voice-frequency tone $f_1$ whenever a ringing signal appears on the voice line at said office terminal, means to transmit a second voice-frequency tone $f_2$ whenever the ringing signal at said office terminal appears between a predetermined side of the voice line and ground, and means to transmit a third voice-frequency tone $f_3$ whenever the direct current component of the ringing signal at said office terminal is of a predetermined polarity, and, at said outlying terminal, switching means to apply a ringing signal to the voice line at said outlying terminal whenever the tone $f_1$ is received, switching means to apply the ringing signal between one side of the voice line at said outlying terminal and ground in the presence of the tone $f_2$ and between the other side of the voice line and ground in the absence of the tone $f_2$, and switching means to provide a ringing signal direct current component of one polarity at said outlying terminal in the presence of the tone $f_3$ and of the opposite polarity in the absence of the tone $f_3$.

2. A combination in accordance with claim 1 in which said means at said office terminal to transmit the tone $f_3$ comprises means to transmit the tone $f_3$ whenever the direct current component of the ringing signal between the respective sides of the voice line at said office terminal is of a predetermined polarity and in which said means at said outlying terminal to provide a ringing signal direct current component comprises means to provide a ringing signal direct current component of one polarity between the respective sides of the voice line at said outlying terminal in the presence of the tone $f_3$ of of the opposite polarity in the absence of the tone $f_3$.

3. A combination in accordance with claim 1 in which said means at said office terminal to transmit the tone $f_3$ comprises means to transmit the tone $f_3$ whenever the direct-current component of the ringing signal between either side of said voice line at said office terminal and ground is of a predetermined polarity and in which said means at said outlying terminal to provide a ringing signal direct-current component comprises means to provide a ringing signal direct-current component of one polarity between the side of the voice line determined by the tone $f_2$ and ground in the presence of the tone $f_3$ and of the opposite polarity in the absence of the tone $f_3$.

4. In a telephone system for transmission between a balanced voice frequency line at an office terminal and a balanced multiparty voice-frequency line at an outlying terminal, an arrangement for transmitting a subscriber ringing signal in the form of low-frequency alternating current superimposed upon direct current between one side of the voice line and ground from said office terminal to said outlying terminal which includes, at said office terminal, means to transmit a first voice-frequency tone $f_1$ whenever a ringing signal appears on the voice line at said office terminal, means to transmit a second voice-frequency tone $f_2$ whenever the ringing signal at said office terminal appears between a predetermined side of the voice line and ground, and means to transmit a third voice-frequency tone $f_3$ whenever the direct-current component of the ringing signal at said office terminal is of a predetermined polarity.

5. A combination in accordance with claim 4 in which said means to transmit the tone $f_3$ comprises means to transmit the tone $f_3$ whenever the direct-current component of the ringing signal between the respective sides of the voice line at said office terminal is of a predetermined polarity.

6. A combination in accordance with claim 4 in which said means to transmit the tone $f_3$ comprises means to transmit the tone $f_3$ whenever the direct-current component of the ringing signal between either side of said voice line at said office terminal and ground is of a predetermined polarity.

7. In a telephone system for transmission between a balanced voice-frequency line at an office terminal and a balanced multiparty voice-frequency line at an outlying terminal, an arrangement for transmitting a subscriber ringing signal in the form of low-frequency alternating current superimposed upon direct-current between one side of the voice line and ground from said office terminal to said outlying terminal which includes, at said outlying terminal, switching means to apply a ringing signal to the voice-frequency line at said outlying terminal whenever a first voice-frequency tone $f_1$ is received, switching means to apply the ringing signal between one side of the voice line at said outlying terminal and ground whenever a second voice-frequency tone $f_2$ is received and between the other side of the voice line and ground in the absence of the tone $f_2$, and switching means to provide a ringing signal direct-current component of one polarity at said outlying terminal whenever a third voice-frequency tone $f_3$ is received and of the opposite polarity in the absence of the tone $f_3$.

8. A combination in accordance with claim 7 in which said means to provide a ringing signal direct-current component comprises means to provide a ringing signal direct-current component of one polarity between the respective sides of the voice line at said outlying terminal in the presence of the tone $f_3$ and of the opposite polarity in the absence of the tone $f_3$.

9. A combination in accordance with claim 7 in which said means to provide a ringing signal direct-current component comprises means to provide a ringing signal direct-current component of one polarity between the side of the voice line determined by the tone $f_2$ and ground in the presence of the tone $f_3$ and of the opposite polarity in the absence of the tone $f_3$.

10. In a carrier telephone system for transmission between a balanced voice-frequency line at an office terminal and a balanced multiparty voice-frequency line at an outlying terminal, an arrangement for transmitting a subscriber ringing signal in the form of low-frequency alternating current superimposed upon direct current between one side of the voice line and ground from said office terminal to said outlying terminal which includes, at said office terminal, a modulator for converting voice frequencies to carrier frequencies, a first source of a first voice-frequency tone $f_1$, a first switch responsive to alternating half-cycles of an alternating-current signal connected to close on alternating half-cycles of the alternating-current component of a ringing signal applied to said office terminal and pass bursts of the tone $f_1$ to said modulator, a second source of a second voice-frequency tone $f_2$, a second switch responsive to a direct-current signal connected to close whenever the direct-current component of a ringing signal applied to said office terminal appears between a predetermined side of the voice line at said office terminal and ground, a third source of a third voice-frequency tone $f_3$, and a third switch responsive to a direct-current signal connected to close whenever the direct-current component of a ringing signal applied to said office terminal is of a predetermined polarity, and, at said outlying terminal, a demodulator for converting carrier frequencies to voice frequencies, a local source of direct-current power, a first relay, a first detector for the tone $f_1$ coupled between said demodulator and said first relay, said first relay operating in the presence of the tone $f_1$ to apply to the voice line at said outlying terminal a ringing signal having an alternating-current component substantially equal in frequency to the frequency of the alternating-current component of the ringing signal applied to said office terminal, a second relay, a second detector for the tone $f_2$ coupled between said demodulator and said second relay, said second relay operating to ground respectively opposite sides of the voice line at said outlying terminal in the presence and absence of the tone $f_2$, a third relay, and a third detector for the tone $f_3$ coupled between said demodulator and said third relay, said third relay operating to provide respectively opposite direct-current polarities on the voice line at said outlying terminal in the presence and absence of the tone $f_3$.

11. A combination in accordance with claim 10 in which said third switch is connected to close whenever the direct-current component of a ringing signal applied to said office terminal is of a predetermined polarity between the respective sides of the voice line at said office terminal and in which said third relay operates to provide respectively opposite direct-current polarities between the respective sides of the voice line at said outlying terminal in the presence and absence of the tone $f_3$.

12. A combination in accordance with claim 10 in which said third switch is connected to close whenever the direct-current component of a ringing signal applied to said office terminal is of a predetermined polarity between either side of the voice line at said office terminal and ground and in which said third relay operates to provide respectively opposite direct-current polarities between the ungrounded side of the voice line at said outlying terminal and ground in the presence and absence of the tone $f_3$.

13. In a carrier telephone system for transmission between a balanced voice-frequency line at an office terminal and a balanced multiparty voice-frequency line at an outlying terminal, an arrangement for transmitting a subscriber ringing signal in the form of low-frequency alternating current superimposed upon direct current between one side of the voice line and ground from said office terminal to said outlying terminal which includes, at said office terminal, a modulator for converting voice frequencies to carrier frequencies, a first source of a first voice-frequency tone $f_1$, a first switch responsive to alternating half-cycles of an alternating-current signal connected to close on alternating half-cycles of the alternating-current component of a ringing signal applied to said office terminal and pass bursts of the tone $f_1$ to said modulator, a second source of a second voice-frequency tone $f_2$, a second switch responsive to a direct-current signal connected to close whenever the direct-current component of a ringing signal applied to said office terminal appears between a predetermined side of the voice line at said office terminal and ground, a third source of a third voice-frequency tone $f_3$, and a third switch responsive to a direct-current signal connected to close whenever the direct-current component of a ringing signal applied to said office terminal is of a predetermined polarity.

14. A combination in accordance with claim 13 in which said third switch is connected to close whenever the direct-current component of a ringing signal applied to said office terminal if of a predetermined polarity between the respective sides of the voice line at said office terminal.

15. A combination in accordance with claim 13 in which said third switch is connected to close whenever the direct-current component of a ringing signal applied to said office terminal is of a predetermined polarity between either side of the voice line at said office terminal and ground.

16. In a carrier telephone system for transmission between a balanced voice-frequency line at an office terminal and a balanced multiparty voice-frequency line at an outlying terminal, an arrangement for transmitting a subscriber ringing signal in the form of low-frequency alternating current superimposed upon direct current between one side of the voice line and ground from said office terminal to said outlying terminal which includes, at said outlying terminal, a demodulator for converting carrier frequencies into voice frequencies, a local source of direct-current power, a first relay, a first detector for a first voice-frequency tone $f_1$ coupled between said demodulator and said first relay, said first relay operating in the presence of the tone $f_1$ to apply to the voice line at said outlying terminal a ringing signal having an alternating-current component substantially equal in frequency to the frequency of the alternating-current component of the ringing signal applied to said office terminal, a second relay, a second detector for a second voice-frequency tone $f_2$ coupled between said demodulator and said second relay, said second relay operating to ground respectively opposite sides of the voice line at said outlying terminal in the presence and abscence of the tone $f_2$, a third relay, and a third detector for a third voice-frequency tone $f_3$ coupled between said demodulator and said third relay, said third relay operating to provide respectively opposite direct-current polarities on the voice line at said outlying terminal in the presence and absence of the tone $f_3$.

17. A combination in accordance with claim 16 in which said third relay operates to provide respectively opposite direct-current polarities between the respective sides of the voice line at said outlying terminal in the presence and absence of the tone $f_3$.

18. A combination in accordance with claim 16 in which said third relay operates to provide respectively opposite direct-current polarities between the ungrounded side of the voice line at said outlying terminal and ground in the presence and absence of the tone $f_3$.

No references cited.